March 29, 1966  W. W. HOSHELL  3,243,223
ADJUSTABLE AUTOMOBILE DOOR MOLDING
Filed March 27, 1964
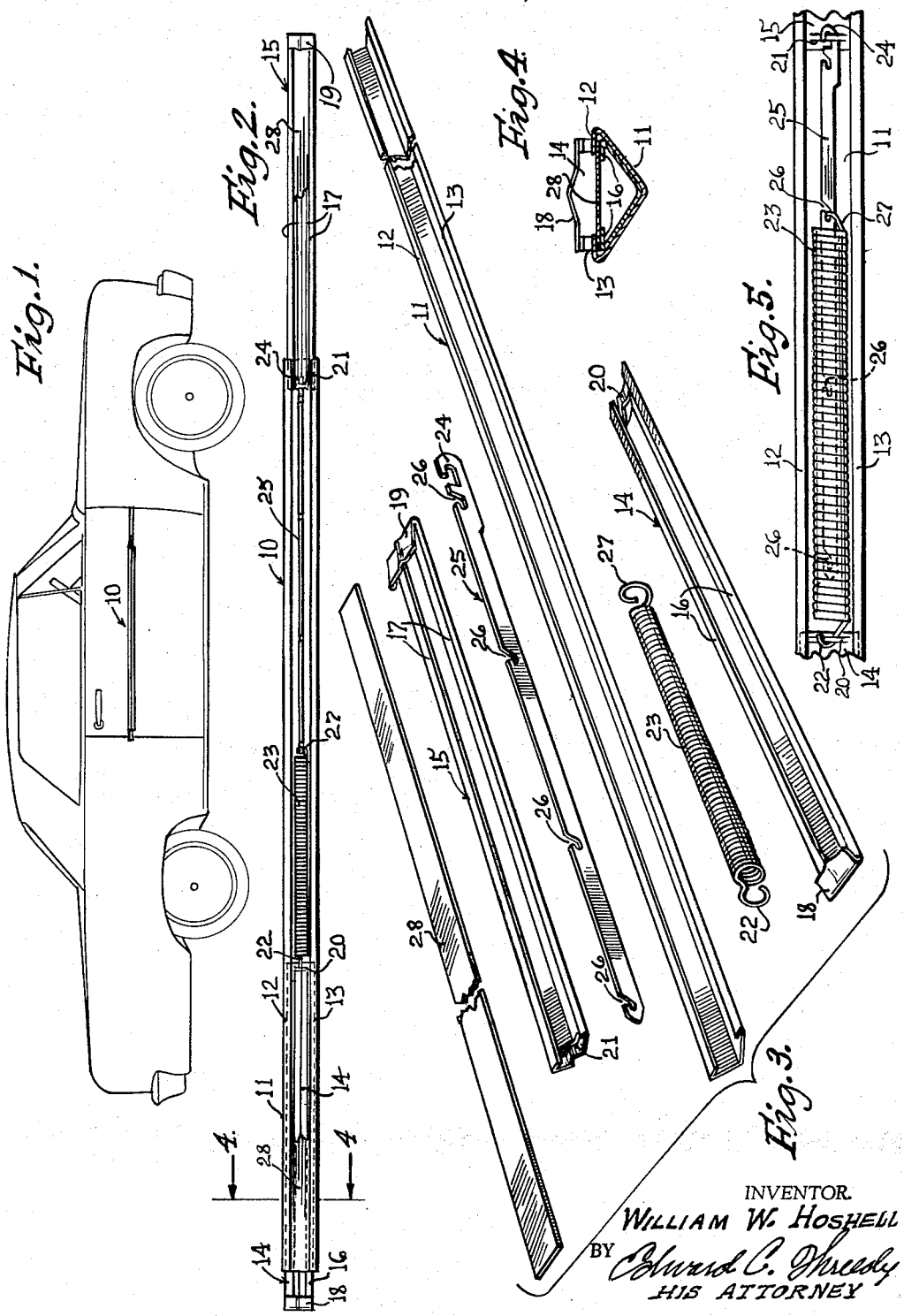
INVENTOR.
WILLIAM W. HOSHELL
BY
HIS ATTORNEY United States Patent Office 3,243,223
Patented Mar. 29, 1966

3,243,223
ADJUSTABLE AUTOMOBILE DOOR MOLDING
William W. Hoshell, 945 Mapleton Ave.,
Oak Park, Ill.
Filed Mar. 27, 1964, Ser. No. 355,312
1 Claim. (Cl. 296—44)

My invention relates to a new and useful improvement in an adjustable automobile door molding and more particularly to a protective type decorative molding that may be readily attached to the door of an automobile.

A principal object of my invention is to provide in a door molding of this character a means for readily adjusting the longitudinal length thereof through the arrangement of telescopical sections, so the same may be connected to doors of various widths.

A further object of my invention is the provision in a device of this character of a spring tension connecting means for securing the molding to an automobile door in a position where it will function as a bumper to protect the painted surface of the door, while at the same time be esthetically pleasing to the eye.

Yet another equally important object of my invention is the provision in a car door molding of a means to vary the spring tension acting upon the telescopical sections of the molding so the same may be longitudinally adjustable with respect to each other to correspond to doors of various widths while functioning to maintain sufficient compression between such telescopical sections so as to securely mount the molding onto the door.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of my improved molding mounted upon an automobile door;

FIG. 2 is a rear plan view showing the telescopic sections of the molding and the adjustable spring tension arrangement therebetween;

FIG. 3 is an exploded view of the parts of my adjustable door molding;

FIG. 4 is a detail sectional view taken on line 4—4 of FIG. 2; and

FIG. 5 is a fragmentary plan view of a portion of my door molding.

Many of the present-day automobiles are designed so that the outer finished surfaces of the doors thereof are without a protective and/or decorative molding. It is the object of my invention to provide a protective-decorative molding that is simple in construction, comprises relatively few parts, and one which may be readily attached to the various size doors of the present-day automobiles.

My improved, adjustable car door molding 10 includes an elongated V-shaped body member 11. The free peripheral edges of the V-shaped body member 11 are formed to provide base flanges 12 and 13 which extend in the direction of each other throughout the length of the body member 11 so as to lie in a common longitudinal plane.

Into the opposite ends of the body member 11 telescopically ride end sections 14 and 15. These end sections 14 and 15 are substantially V-shaped in cross section and are of a size which permits easy insertion thereof into the ends of the body member 11. Each of the end sections 14 and 15 provides opposite flanges 16 and 17 respectively which are adapted to underlie the base flanges 12 and 13 provided by the body member 11.

The section 14 has one end thereof flattened and bent back upon itself so as to provide a clamp end 18. The section 15 has its opposite end flattened and bent back upon itself to provide a clamp end 19, similar to the clamp end 18, formed on the end of the section 14. When the sections 14 and 15 are telescopically disposed within the body member 11, the respective clamp ends 18 and 19 of the sections 14 and 15 will extend in opposite directions toward each other as seen in FIG. 2. Each of the sections 14 and 15 have their ends opposite the clamp ends 18 and 19 respectively, formed to provide a raised stirrup 20 and 21 which extends into the direction of the flanges 16 and 17 provided by the sections 14 and 15.

Connected to the stirrup 20 of the section 14 when it is telescoped within the body member 11 is one end 22 of a coil spring 23. Adapted to be attached to the stirrup 21 of the section 15 when it is telescoped into the opposite end of the body member 11, is the hooked end 24 of an adjusting bar 25. This adjusting bar 25 has one edge thereof, as well as one end, provided with notches 26, the purpose of which will be hereinafter made apparent.

When the molding is assembled as shown in FIG. 2, with the sections 14 and 15 disposed within the opposite ends of the body member 11, the adjusting bar 25 will be inserted within the coils of the spring 23 and the free end 27 of the spring 23 will be attached to one of the notches 26 formed in the bar 25. When the molding is to be attached to an automobile door, the sections 14 and 15 are withdrawn from opposite ends of the body member 11 against the compression force of the spring 23. The clamp ends 18 and 19 of each of the sections 14 and 15 are then placed over opposite edges of the door of the automobile, where the compression force of the spring 23 will securely hold the molding in any desired position.

In order to permit the molding to be attached to doors of various widths and to permit the compression spring 23 to maintain a sufficient amount of tension between the telescopic ends 14 and 15 relative to the body member 11 to secure the molding to the door, the end 27 of the spring 23 may be readily attached to any one of the notches 26 formed in the bar 25 to accomplish this desired result.

To protect the car door against damage from the spring 23, on the inner ends of the sections 14 and 15, when they move telescopically in the member 11, I have provided a plastic insert 28 which will snap in behind the base flanges 12 and 13 provided by the body member 11. This plastic insert 28 is of a length equal to that of the body member 11 and thus protects the car door finish from being engaged by the spring 23 and adjusting bar 25 as the same are caused to move during the adjustment of the end sections 14 and 15.

While I have illustrated and described the preferred form of construction for carrying my invention into effect, this is capable of variation and modification without departing from the spirit of the invention. I, therefore, do not wish to be limited the precise details of construction set forth, but desire to avail myself of such variations and modifications as come within the scope of the appended claim.

Having thus described my invention, what I claim as new and desire to protect by Letters Patent is:

A protective and decorative molding for automobile doors and the like, comprising
 (a) an elongated hollow base member substantially V-shaped in cross section,
 (b) extension sections substantially V-shaped in cross section and of a size to permit telescopical insertion thereof in opposite ends of said base member and movable relative thereto through a common plane to vary the longitudinal length of the molding,
 (c) clamp elements on the opposite free ends of each of said sections for connecting the molding to corresponding opposite side edges of a door, (d) a coil compression spring within said housing and connected between said sections to yieldably resist longitudinal outward movement of said sections from said housing, an elongated bar telescoped within said coil spring and adjustably connected between one end of one of said sections and said coil spring to vary the yieldable resistance thereof upon said sections so as to permit said sections to be moved through a common plane relative to said base member a distance equal to their full longitudinal length so as to secure the molding on doors having various widths, and a backing member carried by said base member for shielding said coil spring and said bar from the surface of the door when said molding is adjustably mounted thereon.

References Cited by the Examiner
UNITED STATES PATENTS

| | | |
|---|---|---|
| 1,856,115 | 5/1932 | Sallop. |
| 2,675,983 | 4/1954 | King _____ 293—62 |
| 2,889,165 | 6/1959 | Zientara. |

BENJAMIN HERSH, *Primary Examiner.*

P. GOODMAN, *Assistant Examiner.*